(12) United States Patent
Bae et al.

(10) Patent No.: US 11,643,952 B2
(45) Date of Patent: May 9, 2023

(54) METHOD OF CONTROLLING ELECTRIC OIL PUMP FOR VEHICLE

(71) Applicants: Hyundai Motor Company, Seoul (KR); Kia Corporation, Seoul (KR)

(72) Inventors: Bong Uk Bae, Daegu (KR); Se Hwan Jo, Bucheon-si (KR); Ki Bum Kim, Seoul (KR); Jin Young Hwang, Suwon-si (KR); Seong Min Son, Pohang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/730,762

(22) Filed: Apr. 27, 2022

(65) Prior Publication Data

US 2023/0051429 A1 Feb. 16, 2023

(30) Foreign Application Priority Data

Aug. 11, 2021 (KR) .......................... 10-2021-0106060

(51) Int. Cl.
*F01M 1/16* (2006.01)
*F01M 1/02* (2006.01)
*F01M 1/20* (2006.01)

(52) U.S. Cl.
CPC ............... *F01M 1/16* (2013.01); *F01M 1/02* (2013.01); *F01M 1/20* (2013.01); *F01M 2001/0215* (2013.01); *F01M 2250/60* (2013.01)

(58) Field of Classification Search
CPC .. F01M 1/16; F01M 1/02; F01M 1/20; F01M 2001/0215; F01M 2250/60; G01P 3/28; F16H 57/0412; F16H 57/0435
See application file for complete search history.

(56) References Cited

U.S. PATENT DOCUMENTS

| 2013/0259709 | A1* | 10/2013 | Lee | .......................... | F01M 1/16 137/565.11 |
| 2017/0167596 | A1* | 6/2017 | Nishimine | .......... | F16H 57/0435 |
| 2017/0285062 | A1 | 10/2017 | Kim | | |
| 2019/0331216 | A1* | 10/2019 | Dong | .................. | F16H 61/0025 |

FOREIGN PATENT DOCUMENTS

KR 20170111606 A 10/2017

* cited by examiner

*Primary Examiner* — Syed O Hasan
(74) *Attorney, Agent, or Firm* — Slater Matsil, LLP

(57) ABSTRACT

A method of controlling an electric oil pump (EOP) for a vehicle includes, if a current temperature of oil is lower than a reference temperature, determining whether an EOP RPM is lower than a minimum driving RPM, if the EOP RPM is lower than the minimum driving RPM, applying a first reduction rate for a first setting time and reducing a target line pressure and an instruction RPM of the EOP, if the EOP RPM is equal to or higher than the minimum driving RPM, determining whether vibration of the EOP RPM is generated above a reference vibration, and if the vibration is generated above the reference vibration, applying a second reduction rate for a second setting time and reducing the target line pressure or the instruction RPM of the EOP.

20 Claims, 4 Drawing Sheets

METHOD OF CONTROLLING ELECTRIC OIL PUMP FOR VEHICLE

CROSS-REFERENCE TO RELATED APPLICATIONS

This application claims the benefit of Korean Patent Application No. 10-2021-0106060, filed on Aug. 11, 2021, which application is hereby incorporated herein by reference.

TECHNICAL FIELD

The present disclosure relates to technology for controlling an electric oil pump (EOP) installed on a powertrain of a vehicle.

BACKGROUND

To supply oil to a transmission constituting a powertrain of a hybrid vehicle, the vehicle is sometimes equipped with an electric oil pump (EOP) only.

Meanwhile, due to various driving environments of the vehicle, the EOP should be operated from a very low temperature such as −35° C. to a high temperature of 140° C. or higher.

When the EOP should be driven in the cryogenic environment, a driving failure of the EOP may occur due to excessive viscosity or the like of the oil, or breakage of the EOP or damage of an inverter driving the EOP may be caused due to an action of an excessive load.

The foregoing explained as the above background is intended merely to aid in the understanding of the background of the present disclosure, and is not intended to mean that the present disclosure falls within the purview of the related art that is already known to those skilled in the art.

SUMMARY

Embodiments of the present disclosure can solve problems associated with the related art, and an embodiment of the present disclosure provides a method of controlling an electric oil pump (EOP) for a vehicle, which makes it possible to prevent damage to the EOP or an inverter to improve durability of the EOP or the inverter while allowing the EOP to pump oil as far as possible when the EOP should be driven in a cryogenic environment.

A method of controlling an EOP for a vehicle according to embodiments of the present disclosure includes the steps of determining whether a current temperature of oil is lower than a predetermined reference temperature, if the current temperature of the oil is lower than the reference temperature, determining whether the EOP rotations per minute (RPM) is lower than predetermined minimum driving RPM, if the EOP RPM is lower than the minimum driving RPM, applying a predetermined first reduction rate to a target line pressure and an instruction RPM of the EOP for a predetermined first setting time and reducing the target line pressure and the instruction RPM of the EOP, if the EOP RPM is higher than or equal to the minimum driving RPM, determining whether vibration of the EOP RPM is generated above a predetermined reference vibration, and if the vibration of the EOP RPM is generated above the reference vibration, applying a predetermined second reduction rate to the target line pressure or the instruction RPM of the EOP for a predetermined second setting time and reducing the target line pressure or the instruction RPM of the EOP.

Here, in the step of determining whether the EOP RPM is lower than the predetermined minimum driving RPM, it may be determined whether an average value of EOP RPMs is lower than the minimum driving RPM for a predetermined third reference time from after a predetermined first reference time from a point in time when driving of the EOP is initiated to a predetermined second reference time.

Moreover, the step of reducing the target line pressure and the instruction RPM of the EOP at the first reduction rate may include multiplying the target line pressure and the instruction RPM of the EOP by the first reduction rate and reducing the target line pressure and the instruction RPM of the EOP, and then, setting the first reduction rate to be gradually reduced whenever the step of reducing the target line pressure and the instruction RPM of the EOP at the first reduction rate is repeatedly performed as a current temperature condition and an EOP RPM condition of the oil are satisfied.

Moreover, the step of reducing the target line pressure and the instruction RPM of the EOP at the first reduction rate may include informing a driver of a failure of the EOP when the current temperature condition and the EOP RPM condition of the oil are satisfied even after the step of reducing the target line pressure and the instruction RPM of the EOP at the first reduction rate is repeated by the predetermined number of first repeat reference times.

Moreover, a step of increasing a first fail safe count may be performed whenever the step of reducing the target line pressure and the instruction RPM of the EOP at the first reduction rate is completed, a step of restoring the target line pressure and the instruction RPM of the EOP to original values may be performed. The steps may be repeatedly performed from a step of determining a current temperature condition of the oil after the target line pressure and the instruction RPM of the EOP are restored to original values, and in the step of reducing the target line pressure and the instruction RPM of the EOP at the first reduction rate, as the first fail safe count increases, the first reduction rate may be set to be small.

Moreover, the method may further include a step of resetting the first fail safe count and informing a driver of a failure of the EOP if the first fail safe count becomes larger than the predetermined number of first repeat reference times.

Meanwhile, in the step of determining whether vibration of the EOP RPM is generated above the reference vibration, if the number of times which the EOP RPM is changed above a predetermined ΔRPM up and down on the basis of the instruction RPM of the EOP for a predetermined fourth reference time is equal to or more than the predetermined number of reference vibrations, it may be determined that the vibration of the EOP RPM is generated above the reference vibration.

Also, the step of applying the second reduction rate to the target line pressure or the instruction RPM of the EOP and reducing the target line pressure or the instruction RPM of the EOP may include multiplying the target line pressure of the EOP by the second reduction rate and reducing the target line pressure of the EOP and then setting the second reduction rate to be gradually reduced whenever the step of reducing the target line pressure of the EOP at the second reduction rate is repeatedly performed because a current temperature condition of the oil is satisfied but an EOP RPM condition of the oil is not satisfied.

Moreover, even after the step of reducing the target line pressure of the EOP at the second reduction rate is repeated by the predetermined number of second repeat reference times, when the current temperature condition of the oil is satisfied but the EOP RPM condition of the oil is not satisfied, a failure of the EOP may be informed to a driver.

Moreover, a step of increasing a second fail safe count may be performed whenever the step of reducing the target line pressure of the EOP at the second reduction rate is completed, a step of restoring the target line pressure of the EOP to an original value may be performed, the steps may be repeatedly performed from a step of determining a current temperature condition of the oil after the target line pressure of the EOP is restored to the original value, and in the step of reducing the target line pressure of the EOP at the second reduction rate, as the second fail safe count increases, the second reduction rate may be set to be small.

Moreover, the method may further include a step of resetting the second fail safe count and informing a driver of a failure of the EOP if the second fail safe count becomes larger than the predetermined number of second repeat reference times.

Moreover, the step of applying the second reduction rate to the target line pressure or the instruction RPM of the EOP and reducing the target line pressure or the instruction RPM of the EOP may include multiplying the instruction RPM of the EOP by the second reduction rate and reducing the instruction RPM of the EOP and then setting the second reduction rate to be gradually reduced whenever the step of reducing the instruction RPM of the EOP at the second reduction rate is repeatedly performed as a current temperature condition of the oil is satisfied but an EOP RPM condition of the oil is not satisfied.

Moreover, the step of reducing the instruction RPM of the EOP at the second reduction rate may include informing a driver of a failure of the EOP when the current temperature condition of the oil is satisfied but the EOP RPM condition of the oil is not satisfied even after the step of reducing the instruction RPM of the EOP at the second reduction rate is repeated by the predetermined number of second repeat reference times.

Moreover, a step of increasing a second fail safe count may be performed whenever the step of reducing the instruction RPM of the EOP at the second reduction rate is completed, a step of restoring the instruction RPM of the EOP to an original value may be performed, the steps may be repeatedly performed from a step of determining a current temperature condition of the oil after the instruction RPM of the EOP is restored to the original value, and in the step of reducing the instruction RPM of the EOP at the second reduction rate, as the second fail safe count increases, the second reduction rate may be set to be small.

In addition, the method may further include a step of resetting the second fail safe count and informing a driver of a failure of the EOP if the second fail safe count becomes larger than the predetermined number of second repeat reference times.

Embodiments of the present disclosure make it possible to prevent damage to an EOP or an inverter to improve durability of the EOP or the inverter while allowing the EOP to pump oil as far as possible when the EOP should be driven in a cryogenic environment.

BRIEF DESCRIPTION OF THE DRAWINGS

The Above and Other Objects, Features and Other Advantages of Embodiments of the Present Disclosure Will be More Clearly Understood from the Following Detailed Description when Taken in Conjunction with the Accompanying Drawings, in which.

Figure 1:
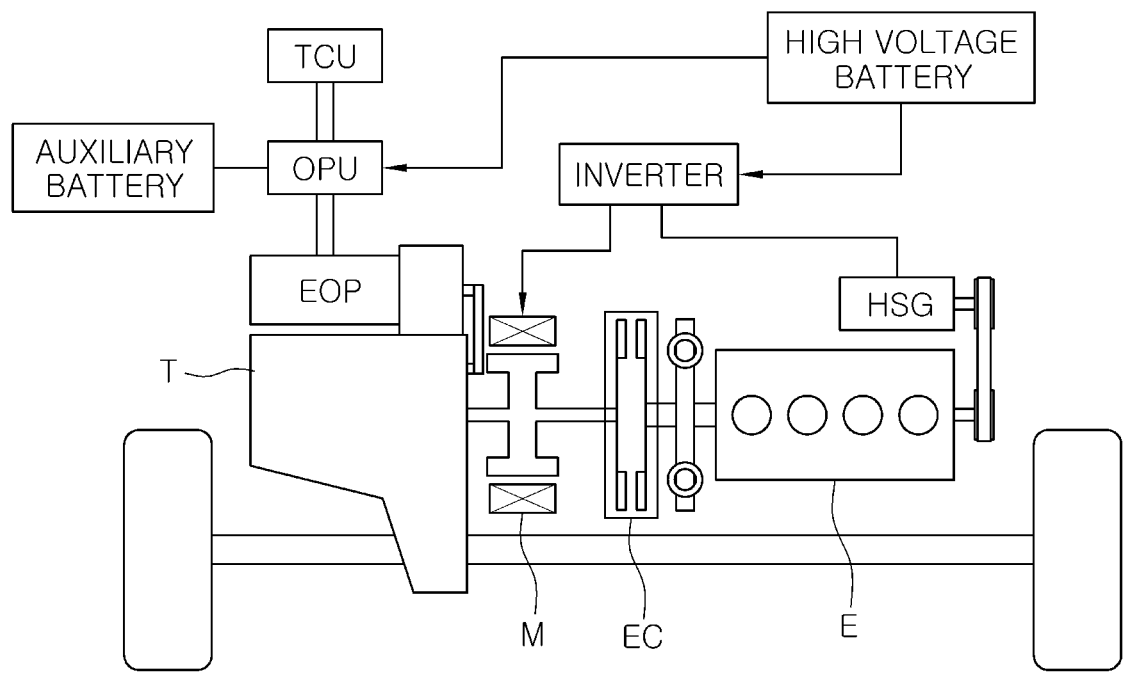
FIG. 1 is a diagram illustrating an example in which an EOP for a hybrid vehicle to which embodiments of the present disclosure can be applied is installed.

The following elements may be used in connection with the figures to describe embodiments of the present disclosure.

E: engine
EC: engine clutch
T: transmission
M: motor

DETAILED DESCRIPTION OF ILLUSTRATIVE EMBODIMENTS

The specific structural or functional description of embodiments of the present disclosure disclosed herein is merely illustrative for the purpose of describing embodiments according to the present disclosure. The embodiments according to the present disclosure can be implemented in various forms, and should not be construed as being limited to the embodiments set forth herein.

The embodiments according to the present disclosure can make various changes and take various forms, and thus particular embodiments will be illustrated in the drawings and described herein in detail. It should be understood, however, that this is not intended to limit the embodiments according to the subject matter of the present disclosure to the disclosed particular forms, but includes all modifications, equivalents, or alternatives falling within the spirit and scope of the disclosure.

The terms first, second, etc. may be used to describe various components, but the components should not be limited by the terms. The terms may be named only for the purpose of distinguishing one component from another, for example, without departing from the scope of the right according to the subject matter of the present disclosure. A first component may be referred to as a second component. Similarly, the second component may also be referred to as the first component.

It will be understood that, when a component is referred to as being "connected" or "coupled" to another component, it may be directly connected or coupled to the other component, but yet another component may intervene between them. On the other hand, when a component is referred to as being "directly connected" or "directly coupled" to another component, it should be understood that no other component exists in-between. Other expressions that describe a relationship between components, such as "between" and "just between" or "adjacent to" and "directly adjacent to" should be interpreted as well.

The terminology used herein is only for the purpose of describing particular embodiments, and is not intended to limit the present disclosure. The singular expressions include plural expressions unless the context clearly indicates otherwise. In this specification, the terms "comprising" or "having" and the like are used to specify that there are features, numbers, steps, operations, components, parts or combinations thereof described herein, but do not preclude the presence or addition of one or more other features, integers, steps, operations, components, parts, or combinations thereof.

Unless otherwise defined, all terms used herein, including technical or scientific terms, have the same meaning as commonly understood by those having ordinary skill in the art to which the present disclosure pertains. Terms such as those defined in commonly used dictionaries are to be interpreted as having a meaning consistent with the meaning of the context in the relevant art and, unless explicitly defined herein, are not to be interpreted as ideal or overly formal meanings.

Hereinafter, exemplary embodiments of the present disclosure will be described in detail with reference to the accompanying drawings. The same reference numeral given in each of the drawings denotes the same member.

FIG. 1 is a diagram illustrating a state in which an electric oil pump (EOP) for a hybrid vehicle to which embodiments of the present disclosure can be applied is installed, which is configured to be able to transmit power of an engine E to a transmission T through an engine clutch EC, and a motor M is provided on an input shaft of the transmission T so as to constitute a hybrid powertrain.

The transmission T is equipped with an electric oil pump (EOP) that produces a flow rate of oil to be used to, for example, control the transmission T and the engine clutch EC under the control of an oil pump control unit (OPU).

For reference, a hybrid starter and generator (HSG) is provided on the engine E, and makes it possible to start the engine to produce electric power, and the motor M is installed to be controlled by an inverter.

The transmission is controlled by a transmission control unit (TCU), and the OPU is also controlled by the TCU. The following features of embodiments of the present disclosure may be substantially performed by the controller such as the OPU, and the OPU may be configured to control driving of the EOP using a separate inverter different from the inverter for driving the motor.

Figure 2:
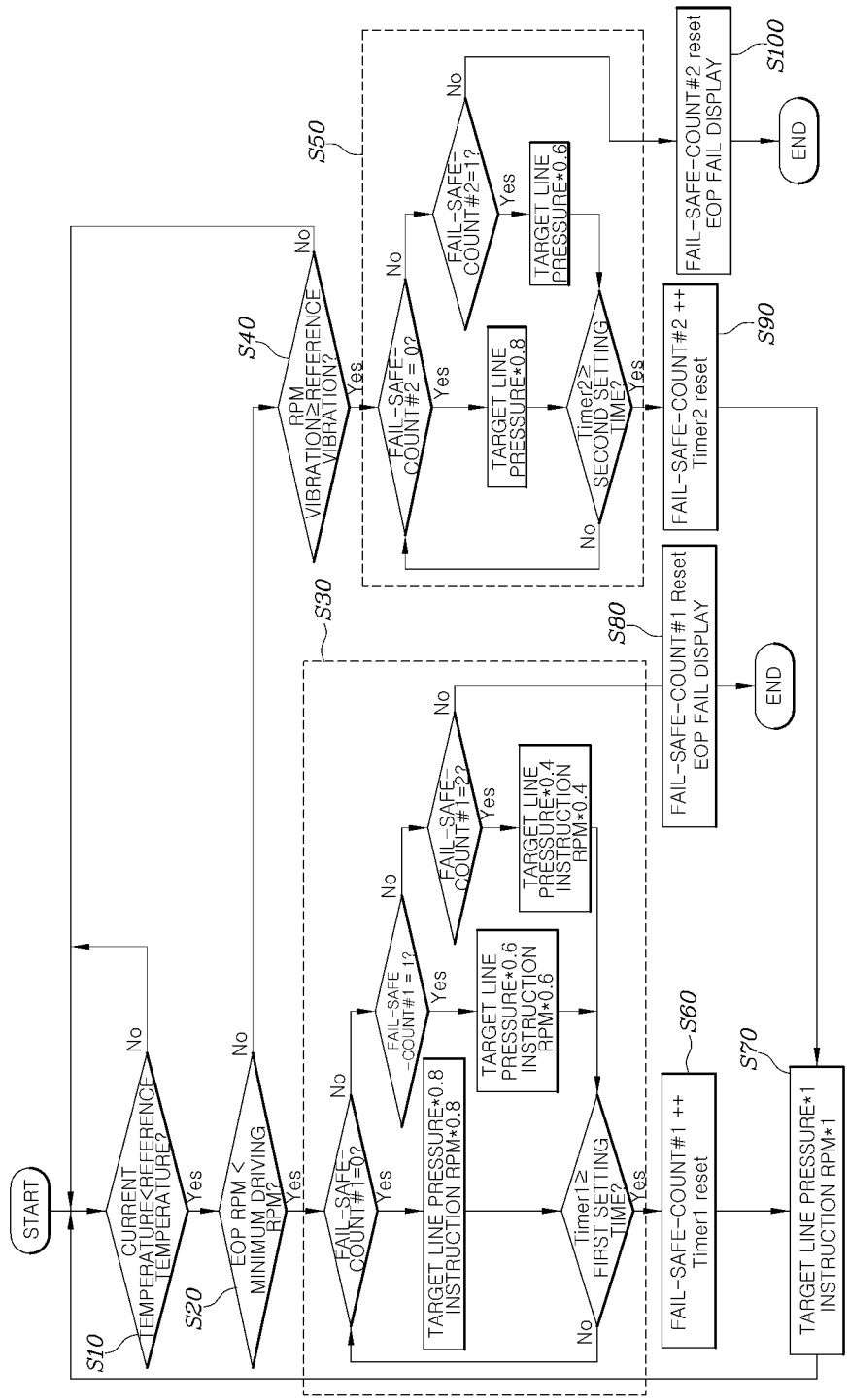
FIG. 2 is a flow chart illustrating a first embodiment of a method of controlling an EOP for a vehicle according to embodiments of the present disclosure.

Referring to FIG. 2, embodiments of a method of controlling an EOP for a vehicle according to the present disclosure includes, in common, a step S10 of determining whether a current temperature of oil is lower than a predetermined reference temperature, a step S20 of determining whether the EOP RPM is lower than predetermined minimum driving RPM if the current temperature of the oil is lower than the reference temperature, a step S30 of applying a predetermined first reduction rate to a target line pressure and an instruction RPM of the EOP for a predetermined first setting time if the EOP RPM is lower than the minimum driving RPM and reducing the target line pressure and the instruction RPM of the EOP, a step S40 of determining whether vibration of the EOP RPM is generated above a predetermined reference vibration if the EOP RPM is higher than the minimum driving RPM, and a step S50 of applying a predetermined second reduction rate to the target line pressure or the instruction RPM of the EOP for a predetermined second setting time if the vibration of the EOP RPM is more than the reference vibration and reducing the target line pressure and the instruction RPM of the EOP.

In the step S10 of determining whether a current temperature of oil is lower than a predetermined reference temperature, because the current temperature of the oil to be pumped by the EOP is in a cryogenic state, it is determined whether there is a situation that, due to, for instance, excessive viscosity of the oil, it is feared that driving of the EOP fails or an excessive load acts on the EOP.

Therefore, the reference temperature can be decided in view of design by multiple experiments and analyses according to the embodiment as described above, and be set to, for instance, −10° C.

Moreover, in the step S20 of determining whether the EOP RPM is lower than the predetermined minimum driving RPM, it is determined whether it can be regarded that, even if a command to drive the EOP is given, the EOP is hardly driven. The minimum driving RPM can be set in view of design by multiple experiments and analyses according to this meaning, and be set to, for instance, 10 RPM.

That is, embodiments of the present disclosure are configured to be divided into a situation that, when the temperature of the oil to be pumped by the EOP is in a cryogenic state, even if the command to drive the EOP is given, the EOP is hardly rotated, which can be determined as EOP FAIL, and a situation that the EOP is somewhat rotated and an overload acts on the EOP and, as a result, changes countermeasures.

Here, the countermeasures according to the above-described situations are each made up of the step S30 of applying a predetermined first reduction rate to a target line pressure and an instruction RPM of the EOP for a predetermined first setting time and reducing the target line pressure and the instruction RPM of the EOP, and the step S50 of applying a predetermined second reduction rate to the target line pressure or the instruction RPM of the EOP for a predetermined second setting time and reducing the target line pressure and the instruction RPM of the EOP, and ultimately perform driving of the EOP again and again while reducing a load of the EOP. As will be described below, if an operation of the EOP is not normal after a predetermined repeat is done, an additional repeat is stopped, and a failure of the EOP is informed to a driver. Thereby, it is possible to prevent damage to the EOP and the inverter driving the EOP and to secure durability of the EOP and the inverter.

Therefore, the first setting time and the second setting time can be decided in view of design by multiple experiments and analyses according to the meaning as described above, and be set to values identical to each other. The first setting time may be set to be shorter than the second setting time. For example, the first setting time may be set to 1.5 sec, and the second setting time may be set to 2 sec.

In the step S20 of determining whether the EOP RPM is lower than the predetermined minimum driving RPM, it may be made to determine whether an average value of the EOP RPMs for a predetermined third reference time from after a predetermined first reference time from a point in time when the driving of the EOP is initiated to a predetermined second reference time is lower than the minimum driving RPM.

For example, if the first reference time is set to 1000 ms, the second reference time is set to 500 ms, and the third reference time is set to 300 ms, an average value of the EOP RPMs for the previous 300 ms is obtained in each control cycle from after 1000 ms from the point in time when the driving of the EOP is initiated, and is compared with the minimum driving RPM. This comparison is performed from the point in time when the driving of the EOP is initiated until 1500 ms is obtained by adding up the first reference time and the second reference time.

Here, if the state in which the EOP RPM is continuously lower than the minimum driving RPM continues from a point in time when 1000 ms has elapsed from the point in time when the driving of the EOP is initiated to a point in time when 1500 ms has elapsed from the point in time when the driving of the EOP is initiated, it is determined that the EOP RPM is lower than the minimum driving RPM.

The step S30 of reducing the target line pressure and the instruction RPM of the EOP at the first reduction rate includes reducing the target line pressure and the instruction RPM of the EOP by multiplying the first reduction rate by each of the target line pressure and the instruction RPM of the EOP, and whenever a current temperature condition of the oil and an EOP RPM condition are continuously satisfied, and the step S30 of reducing the target line pressure and the instruction RPM of the EOP at the first reduction rate is repeatedly performed, the first reduction rate may be set to be gradually reduced.

Moreover, after the step S30 of reducing the target line pressure and the instruction RPM of the EOP at the first reduction rate, it may be configured to inform a driver of a failure of the EOP when the current temperature condition of the oil and the EOP RPM condition are satisfied even after the step 30 is repeated the predetermined number of first repeat reference times.

That is, whenever the step S30 of reducing the target line pressure and the instruction RPM of the EOP at the first reduction rate is completed, a step S60 of increasing a first fail safe count FAIL-SAFE-COUNT #1 is performed, and a step S70 of restoring the target line pressure and the instruction RPM of the EOP to original values is performed. After the target line pressure and the instruction RPM of the EOP are restored to the original values, the method is repeatedly performed from the step S10 of determining the current temperature condition of the oil. In the step S30 of reducing the target line pressure and the instruction RPM of the EOP at the first reduction rate, the first reduction rate is to be set to be small as the first fail safe count FAIL-SAFE-COUNT #1 increases.

Moreover, if the first fail safe count FAIL-SAFE-COUNT #1 becomes greater than the number of first repeat reference times, a step S80 of resetting the first fail safe count FAIL-SAFE-COUNT #1 and informing the driver of the failure of the EOP is performed.

Figure 3:
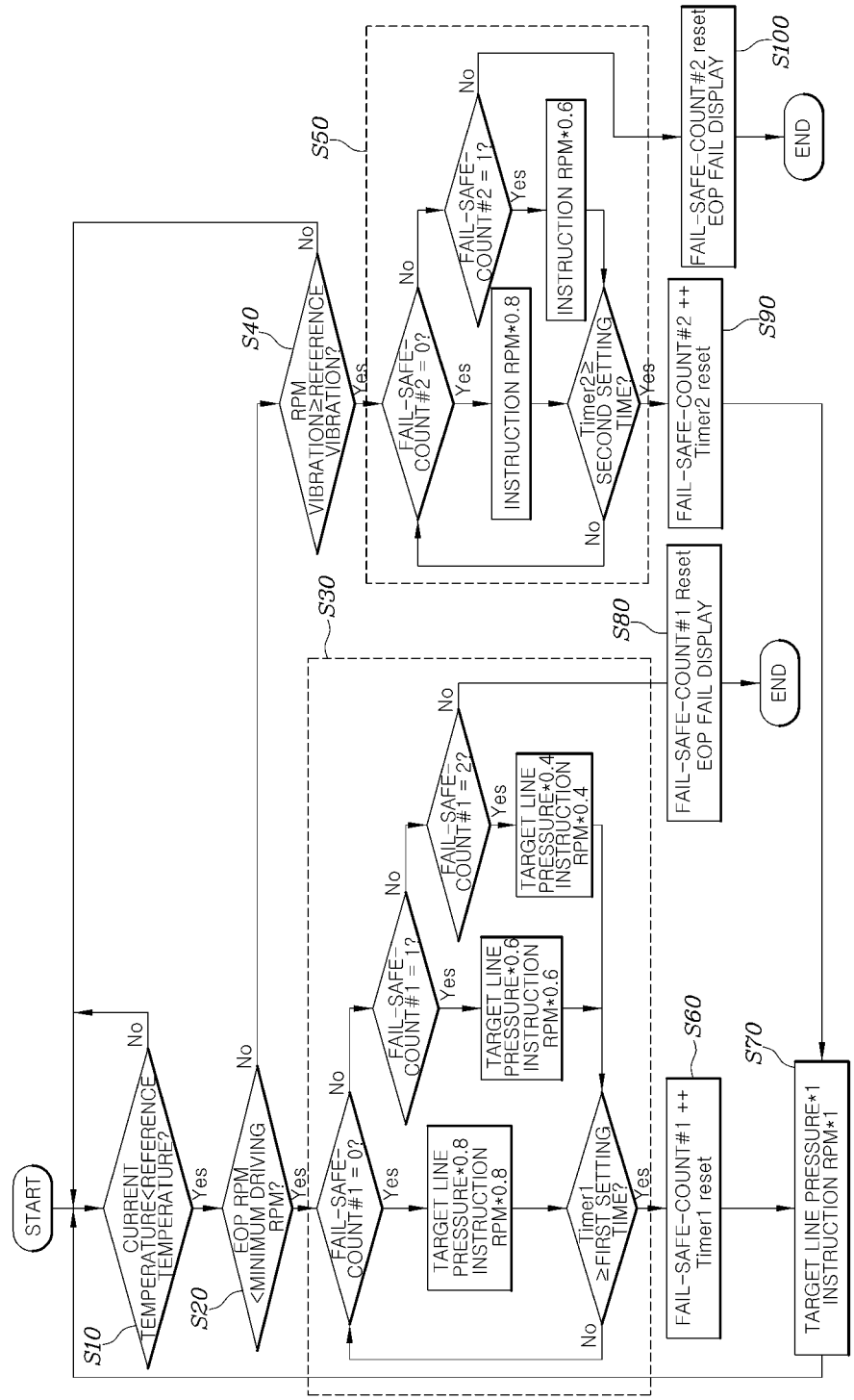
FIG. 3 is a flow chart illustrating a second embodiment of the method of controlling an EOP for a vehicle according to embodiments of the present disclosure.

For example, in FIGS. 2 and 3, the first fail safe count FAIL-SAFE-COUNT #1 starts from an initial value of 0, and is increased by 1 whenever the step S30 is repeated, and whenever the first fail safe count FAIL-SAFE-COUNT #1 is increased, the first reduction rate is adapted to be gradually reduced to 0.8, 0.6, and 0.4, and as an attempt to drive the EOP is repeated, a load of the EOP is made to be gradually reduced. Thereby, damage to the EOP and the inverter that drives the EOP or a reduction in durability thereof can be prevented.

Here, if the number of first repeat reference times becomes 2, and the first fail safe count FAIL-SAFE-COUNT #1 increases from 0 to become 3, a step S80 of resetting the first fail safe count FAIL-SAFE-COUNT #1 to 0 and informing the driver of the failure of the EOP is performed.

Of course, the EOP may begin to be normally driven by the repetitive attempt to drive the EOP. Thereby, embodiments of the present disclosure promote smooth driving of the EOP as far as possible, and make it possible to prevent damage to the EOP and the inverter that drives the EOP or a reduction in durability thereof while making it possible to normally drive a vehicle.

Here, the first reduction rate may be naturally set to another value smaller than 1 in addition to the above example, and the number of first repeat reference times may also be naturally set to another value in consideration of, for instance, the durability of the EOP.

Figure 4:
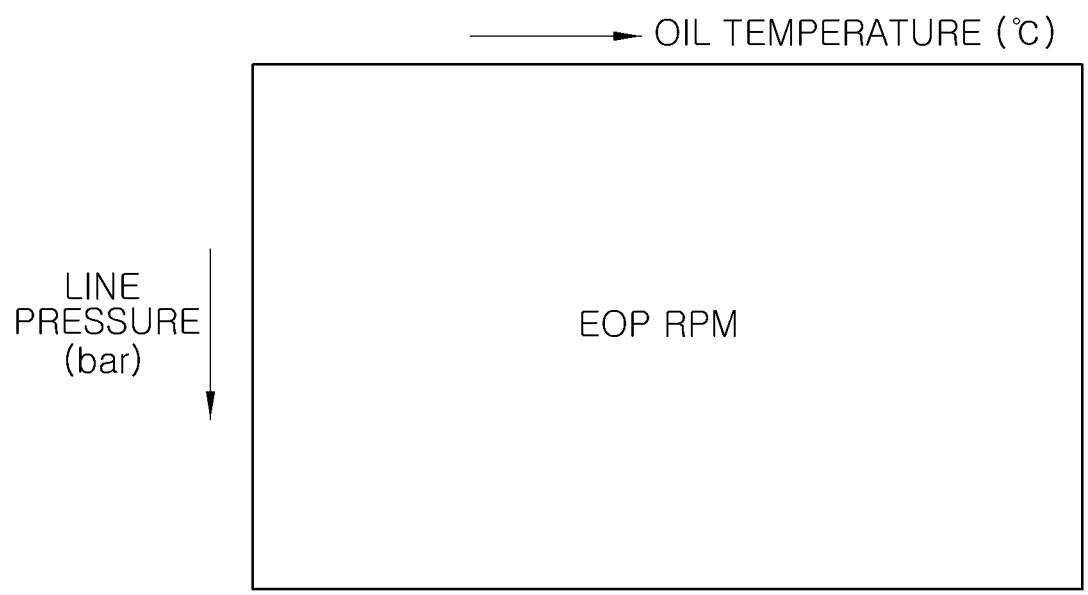
FIG. 4 is a diagram illustrating an example of an EOP RPM map according to an oil temperature and a line pressure.

Moreover, the target line pressure of the EOP is a pressure that is set to a line pressure needed for the transmission at present at the controller such as the OPU, and the instruction RPM is the RPM that is decided from a map of the EOP RPM according to an oil temperature and a line pressure as illustrated in FIG. 4.

Therefore, by multiplying the target line pressure by the first reduction rate, a target line pressure is determined, which is reduced from the target line pressure set first at the controller by the first reduction rate.

Therefore, when the target line pressure is multiplied by the first reduction rate, a target line pressure reduced by the first reduction rate less than the target line pressure initially set by the controller is determined. In addition, using the map as shown in FIG. 4, the instruction RPM according to the current oil temperature and the target line pressure determined as above is obtained. Thereafter, the instruction RPM actually commanded to the EOP is obtained by multiplying the instruction RPM obtained from the map by the first reduction ratio again.

In the step S40 of determining whether vibration of the EOP RPM is generated above the predetermined reference vibration, if the number of times that the EOP RPM varies above a predetermined ΔRPM up and down on the basis of the instruction RPM of the EOP for a predetermined fourth reference time is above the predetermined number of reference vibrations, it is allowed to be determined that the vibration of the EOP RPM is generated above the reference vibration.

For example, in the case where the fourth reference time is set to 500 ms, the instruction RPM is set to 1000 RPM, the ΔRPM is set to 50 RPM, and the number of reference vibrations is set to 6, if the number of times which the EOP RPM is changed between a state in which it is more than or equal to 1050 RPM and a state in which it is less than or equal to 950 RPM for 500 ms is more than or equal to 6, it is determined that the vibration of the EOP RPM is generated above the reference vibration.

This is for determining a situation in which, when an overload acts on the EOP, the EOP is rotated at an RPM higher than the minimum driving RPM wherein the RPM varies up and down centering on the instruction RPM.

Accordingly, the fourth reference time, the ΔRPM, and the number of reference vibrations can be decided in view of design by multiple experiments and analyses so as to be able to detect an overload situation of the EOP according to the meaning as described above.

In the step S50 of applying a second reduction rate to the target line pressure or the instruction RPM of the EOP and reducing the target line pressure and the instruction RPM of the EOP, whenever the step S50 of multiplying the target line pressure of the EOP by the second reduction rate to reduce the target line pressure of the EOP, and reducing the target line pressure of the EOP at the second reduction rate because the current temperature condition of the oil is continuously satisfied, and the EOP RPM condition is not satisfied is repeatedly performed, the second reduction rate may be set to be gradually reduced.

Moreover, after the step S50 of reducing the target line pressure of the EOP at the second reduction rate is repeated by the predetermined number of second repeat reference times, when the current temperature condition of the oil is satisfied but the EOP RPM condition is not satisfied, the step S50 may include making it possible to inform a driver of a failure of the EOP.

That is, whenever the step S50 of reducing the target line pressure of the EOP at the second reduction rate is completed, a step S90 of increasing a second fail safe count FAIL-SAFE-COUNT #2 is performed, a step S70 of restoring the target line pressure of the EOP to an original value is performed, the steps are repeatedly performed from the step S10 of determining the current temperature condition of the oil after restoring the target line pressure of the EOP to an original value, and in the step S50 of reducing the target line pressure of the EOP at the second reduction rate, the second reduction rate is to be set to be small as the second fail safe count FAIL-SAFE-COUNT #2 increases.

Moreover, if the second fail safe count FAIL-SAFE-COUNT #2 is greater than the predetermined number of second repeat reference times, a step S100 of resetting the second fail safe count FAIL-SAFE-COUNT #2 and informing the driver of the failure of the EOP is performed.

For example, in FIGS. 2 and 3, the second fail safe count FAIL-SAFE-COUNT #2 starts from an initial value of 0, and is increased by 1 whenever the step S50 is repeated, and whenever the second fail safe count FAIL-SAFE-COUNT #2 is increased, the second reduction rate is configured to be gradually reduced to 0.8 and 0.6, and as an attempt to drive the EOP is repeated, a load of the EOP is made to be gradually reduced. Thereby, damage to the EOP and the inverter that drives the EOP or a reduction in durability thereof can be prevented.

Here, if the number of second repeat reference times becomes 1 and the second fail safe count FAIL-SAFE-COUNT #2 increases from 0 to become 2, the step S100 of resetting the second fail safe count FAIL-SAFE-COUNT #2 to 0 and informing the driver of the failure of the EOP is performed.

Of course, the EOP may begin to be normally driven by the repetitive attempt to drive the EOP. Thereby, embodiments of the present disclosure promote smooth driving of the EOP as far as possible, and makes it possible to prevent damage to the EOP and the inverter that drives the EOP or a reduction in durability thereof while making it possible to normally drive a vehicle.

Here, the second reduction rate may be naturally set to another value smaller than 1 in addition to the above example, and the number of second repeat reference times may also be naturally set to another value in consideration of, for instance, the durability of the EOP.

For reference, the second embodiment of FIG. 2 and the third embodiment of FIG. 3 are distinguished according to, in performing the step S50 of applying the second reduction rate to the target line pressure or the instruction RPM of the EOP and reducing the target line pressure or the instruction RPM of the EOP, whether to apply the second reduction rate to the target line pressure or whether to apply the second reduction rate to the instruction RPM, the second embodiment is an embodiment that includes, as described above, multiplying the target line pressure by the second reduction rate to reduce the target line pressure, and the third embodiment is an embodiment that includes, as will be described below, multiplying the instruction RPM by the second reduction rate to directly reduce the instruction RPM.

The third embodiment of FIG. 3 includes, in the step S50 of applying the second reduction rate to the target line pressure or the instruction RPM of the EOP and reducing the target line pressure or the instruction RPM of the EOP, multiplying the instruction RPM of the EOP by the second reduction rate and reducing the instruction RPM of the EOP; and then, setting the second reduction rate to be gradually reduced whenever the step S50 of reducing the instruction RPM of the EOP at the second reduction rate is repeatedly performed because a current temperature condition of the oil is satisfied but an EOP RPM condition of the oil is not satisfied.

Moreover, after the step S50 of reducing the instruction RPM of the EOP at the second reduction rate is repeated by the predetermined number of second repeat reference times, when the current temperature condition of the oil is satisfied but the EOP RPM condition of the oil is not satisfied, the step S50 may include making it possible to inform the driver of the failure of the EOP.

That is, whenever the step S50 of reducing the instruction RPM of the EOP at the second reduction rate is completed, a step S90 of increasing a second fail safe count FAIL-SAFE-COUNT #2 is performed, a step S70 of restoring the instruction RPM of the EOP to an original value is performed, the steps are repeatedly performed from the step S10 of determining the current temperature condition of the oil after restoring the instruction RPM of the EOP to an original value, and in the step S50 of reducing the instruction RPM of the EOP at the second reduction rate, the second reduction rate is set to be small as the second fail safe count FAIL-SAFE-COUNT #2 increases.

In addition, if the second fail safe count FAIL-SAFE-COUNT #2 becomes greater than the predetermined number of second repeat reference times, a step S100 of resetting the second fail safe count FAIL-SAFE-COUNT #2 and informing the driver of the failure of the EOP is performed.

For reference, in the present embodiments, each step is advanced from the states in which all of the first fail safe count FAIL-SAFE-COUNT #1, the second fail safe count FAIL-SAFE-COUNT #2, a first timer Timer1, and a second timer Timer2 are initiated to 0, and as can be found in FIGS. 2 and 3, the step S30 of applying the first reduction rate to the target line pressure and the instruction RPM of the EOP for the first setting time and reducing the target line pressure and the instruction RPM of the EOP is performed by comparing the first timer Timer1 with the first setting time, and the step S50 of applying the second reduction rate to the target line pressure or the instruction RPM of the EOP for the second setting time and reducing the target line pressure or the instruction RPM of the EOP is performed by comparing the second timer Timer2 with the second setting time.

While the specific exemplary embodiments of the present disclosure have been illustrated and described, it will be apparent to those skilled in the art that the present disclosure may be variously improved and changed without departing from the technical spirit of the present disclosure provided by the following claims.

What is claimed is:

1. A method of controlling an electric oil pump (EOP) for a vehicle, the method comprising: determining that a current temperature of oil is lower than a predetermined reference temperature; in response to the current temperature of the oil being lower than the reference temperature, determining whether an EOP RPM is lower than a predetermined minimum driving RPM; in response to the EOP RPM being lower than the minimum driving RPM, applying a predetermined first reduction rate to a target line pressure and an instruction RPM of the EOP for a predetermined first setting time; in response to the EOP RPM being equal to or higher than the minimum driving RPM, determining that a vibration of the EOP RPM is generated above a predetermined reference vibration and, in response to the vibration of the EOP RPM being generated above the reference vibration, applying a predetermined second reduction rate to the target line pressure for a predetermined second setting time or applying a predetermined second reduction rate to the instruction RPM of the EOP for a predetermined second setting time.

2. The method according to claim 1, wherein determining whether the EOP RPM is lower than the predetermined minimum driving RPM comprises determining whether an average value of EOP RPMs is lower than the minimum driving RPM for a predetermined third reference time from after a predetermined first reference time from a point in time when driving of the EOP is initiated to a predetermined second reference time.

3. The method according to claim 1, wherein reducing the target line pressure and the instruction RPM of the EOP at the first reduction rate comprises: multiplying the target line pressure and the instruction RPM of the EOP by the first reduction rate and reducing the target line pressure and the instruction RPM of the EOP; and setting the first reduction rate to be gradually reduced in response to reducing the target line pressure and the instruction RPM of the EOP at the first reduction rate until a current temperature condition and an EOP RPM condition of the oil are satisfied.

4. The method according to claim 3, wherein reducing the target line pressure and the instruction RPM of the EOP at the first reduction rate includes informing a driver of a failure of the EOP when the current temperature condition and the EOP RPM condition of the oil are satisfied even after reducing the target line pressure and the instruction RPM of the EOP at the first reduction rate is repeated by a predetermined number of first repeat reference times.

5. The method according to claim 3, further comprising:
increasing a first fail safe count in response to completion of reducing the target line pressure and the instruction RPM of the EOP at the first reduction rate;
restoring the target line pressure and the instruction RPM of the EOP to original values; and
after the target line pressure and the instruction RPM of the EOP are restored to original values, repeatedly performing the method from determining that the current temperature of the oil is lower than the predetermined reference temperature.

6. The method according to claim 5, wherein, during reducing the target line pressure and the instruction RPM of the EOP at the first reduction rate, as the first fail safe count increases, the first reduction rate is set to be small.

7. The method according to claim 6, further comprising resetting the first fail safe count and informing a driver of a failure of the EOP in response to the first fail safe count becoming larger than a predetermined number of first repeat reference times.

8. The method according to claim 3, further comprising:
increasing a first fail safe count in response to completion of reducing the target line pressure and the instruction RPM of the EOP at the first reduction rate;
restoring the target line pressure and the instruction RPM of the EOP to original values; and
after the target line pressure and the instruction RPM of the EOP are restored to original values, determining whether the current temperature of the oil is lower than the predetermined reference temperature.

9. The method according to claim 8, wherein determining whether the current temperature of the oil is lower than the predetermined reference temperature comprises determining that the current temperature of the oil is lower than the predetermined reference temperature, the method further comprising:
again determining whether an EOP RPM is lower than a predetermined minimum driving RPM;
in response to the EOP RPM being lower than the minimum driving RPM, applying a further predetermined first reduction rate to the target line pressure and a further instruction RPM of the EOP for a further predetermined first setting time and reducing the target line pressure and the instruction RPM of the EOP; and
in response to the EOP RPM being equal to or higher than the minimum driving RPM, determining that vibration of the EOP RPM is generated above a further predetermined reference vibration and, in response to the vibration of the EOP RPM being generated above the further reference vibration, applying a further predetermined second reduction rate to the target line pressure or the instruction RPM of the EOP for a further predetermined second setting time and reducing the target line pressure or the instruction RPM of the EOP.

10. The method according to claim 1, wherein determining whether the vibration of the EOP RPM is generated above the reference vibration comprises determining that the vibration of the EOP RPM is generated above the reference vibration based on a number of times which the EOP RPM is changed above a predetermined $\Delta$RPM up and down based on the instruction RPM of the EOP for a predetermined fourth reference time being equal to or more than a predetermined number of reference vibrations.

11. A method of controlling an electric oil pump (EOP) for a vehicle, the method comprising: determining that a current temperature of oil is lower than a predetermined reference temperature; in response to the current temperature of the oil being lower than the reference temperature, determining whether an EOP RPM is lower than a predetermined minimum driving RPM; in response to the EOP RPM being lower than the minimum driving RPM, applying a predetermined first reduction rate to a target line pressure and an instruction RPM of the EOP for a predetermined first setting time and reducing the target line pressure and the instruction RPM of the EOP; and in response to the EOP RPM being equal to or higher than the minimum driving RPM, determining that a vibration of the EOP RPM is generated above a predetermined reference vibration and, in response to the vibration of the EOP RPM being generated above the reference vibration, applying a predetermined second reduction rate to the target line pressure or the instruction RPM of the EOP for a predetermined second setting time and reducing the target line pressure or the instruction RPM of the EOP by multiplying the target line pressure of the EOP by the second reduction rate and reducing the target line pressure of the EOP and setting the second reduction rate to be gradually reduced in response to reducing the target line pressure of the EOP at the second reduction rate being repeatedly performed because a current temperature condition of the oil is satisfied but an EOP RPM condition of the oil is not satisfied.

12. The method according to claim 11, wherein, in response to the current temperature condition of the oil being satisfied but the EOP RPM condition of the oil not being satisfied even after reducing the target line pressure of the EOP at the second reduction rate is repeated by a predetermined number of second repeat reference times, the method further comprises informing a driver of a failure of the EOP.

13. The method according to claim 11, further comprising:
increasing a second fail safe count in response to completion of reducing the target line pressure of the EOP at the second reduction rate;

restoring the target line pressure of the EOP to an original value; and after the target line pressure of the EOP is restored to the original value, repeatedly performing the method from determining that the current temperature of the oil is lower than the predetermined reference temperature.

14. The method according to claim 13, wherein during reducing the target line pressure of the EOP at the second reduction rate, as the second fail safe count increases, the second reduction rate is set to be small.

15. The method according to claim 14, further comprising, in response to the second fail safe count becoming larger than a predetermined number of second repeat reference times, resetting the second fail safe count and informing a driver of a failure of the EOP.

16. A method of controlling an electric oil pump (EOP) for a vehicle, the method comprising:

determining that a current temperature of oil is lower than a predetermined reference temperature;

in response to the current temperature of the oil being lower than the reference temperature, determining whether an EOP RPM is lower than a predetermined minimum driving RPM;

in response to the EOP RPM being lower than the minimum driving RPM, applying a predetermined first reduction rate to a target line pressure and an instruction RPM of the EOP for a predetermined first setting time and reducing the target line pressure and the instruction RPM of the EOP; and in response to the EOP RPM being equal to or higher than the minimum driving RPM, determining whether vibration of the EOP RPM is generated above a predetermined reference vibration and, in response to the vibration of the EOP RPM being generated above the reference vibration, applying a predetermined second reduction rate to the target line pressure or the instruction RPM of the EOP for a predetermined second setting time and reducing the target line pressure or the instruction RPM of the EOP by multiplying the instruction RPM of the EOP by the second reduction rate and reducing the instruction RPM of the EOP, and setting the second reduction rate to be gradually reduced in response to reducing the instruction RPM of the EOP at the second reduction rate being repeatedly performed as a current temperature condition of the oil is satisfied but an EOP RPM condition of the oil is not satisfied.

17. The method according to claim 16, wherein reducing the instruction RPM of the EOP at the second reduction rate further comprises informing a driver of a failure of the EOP in response to the current temperature condition of the oil being satisfied but the EOP RPM condition of the oil not being satisfied even after reducing the instruction RPM of the EOP at the second reduction rate is repeated by a predetermined number of second repeat reference times.

18. The method according to claim 16, further comprising:

increasing a second fail safe count in response to completion of reducing the instruction RPM of the EOP at the second reduction rate;

restoring the instruction RPM of the EOP to an original value; and after the instruction RPM of the EOP is restored to the original value, repeatedly performing the method from determining whether the current temperature of the oil is lower than the predetermined reference temperature.

19. The method according to claim 18, wherein during reducing the instruction RPM of the EOP at the second reduction rate, as the second fail safe count increases, the second reduction rate is set to be small.

20. The method according to claim 19, further comprising, in response to the second fail safe count becoming larger than a predetermined number of second repeat reference times, resetting the second fail safe count and informing a driver of a failure of the EOP.

* * * * *